US006795109B2

(12) United States Patent
Peleg et al.

(10) Patent No.: US 6,795,109 B2
(45) Date of Patent: Sep. 21, 2004

(54) STEREO PANORAMIC CAMERA ARRANGEMENTS FOR RECORDING PANORAMIC IMAGES USEFUL IN A STEREO PANORAMIC IMAGE PAIR

(75) Inventors: Shmuel Peleg, Mevaseret Zion (IL); Moshe Ben-Ezra, Jerusalem (IL); Yael Pritch, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 588 days.

(21) Appl. No.: 09/726,198

(22) Filed: Nov. 29, 2000

(65) Prior Publication Data

US 2001/0020976 A1 Sep. 13, 2001

Related U.S. Application Data

(63) Continuation-in-part of application No. 09/396,248, filed on Sep. 16, 1999.
(60) Provisional application No. 60/198,381, filed on Apr. 19, 2000, provisional application No. 60/174,099, filed on Dec. 31, 1999, and provisional application No. 60/168,422, filed on Nov. 29, 1999.

(51) Int. Cl.[7] .............................................. H04N 5/225
(52) U.S. Cl. ......................... 348/36; 348/343; 348/369
(58) Field of Search ............................. 348/36, 37, 38, 348/39, 46, 49, 335, 343, 369

(56) References Cited

U.S. PATENT DOCUMENTS

| | | |
|---|---|---|
| 5,049,987 A | 9/1991 | Hoppenstein |
| 5,130,794 A | 7/1992 | Ritchey |
| 5,510,831 A | 4/1996 | Mayhew |
| 5,649,032 A | 7/1997 | Burt et al. |
| 5,686,975 A | 11/1997 | Lipton |
| 5,721,585 A | 2/1998 | Keast et al. |
| 5,768,447 A | 6/1998 | Irani et al. |
| 5,790,182 A | * 8/1998 | St. Hilaire .................... 348/36 |

(List continued on next page.)

OTHER PUBLICATIONS

Ishiguro, H. et al.; "Correspondence, Omni–Directional Stereo"; IEEE Transactions on Patern Analysis and Machine Intelligence, vol. 14, No. 2; Feb. 1992; pp. 257–262.

Gluckman, J. et al.; "Real–Time Omnidirectional and Panoramic Stereo;" DARPA Image Understanding Workshop; 1998;.

Kawanishi, T. et al.; "Generation of High–Resolution Stereo Panoramic Images by Omnidirectional Sensor Using Hexagonal Pyramidal Mirrors;" 14th International Conference on Pattern Recognition; pp. 485–489; Brisbane; Australia; Aug. 1998; IEEE Computer Society.

Nayar, S.; "Catadiopotric Omnidirectional Cameras;" IEEE Conference on Computer Vision and Pattern Recognition; pp. 482–488; San Juan; Jun. 1997.

*Primary Examiner*—Howard Britton
(74) *Attorney, Agent, or Firm*—Fenster and Company

(57) ABSTRACT

Various camera arrangements are disclosed comprising a camera and an optical element. The camera is configured to record an image defined by light rays directed thereto. The optical element is configured to deflect rays from a scene to the camera for recording thereby. The optical element is further configured to deflect the rays such that, if the rays were undeflected, the rays would instead be tangent to a viewing device of predetermined shape, such as a circle. Optical elements may be in the form of curved mirrors or lenses. The camera arrangements are configured to record images in the form of left or right panoramic images of a stereo panoramic image pair, and several stereo panoramic camera arrangements are described, including one or more camera arrangements, for contemporaneously recording both left or right panoramic images of a stereo panoramic image pair.

16 Claims, 9 Drawing Sheets

INCOMING RAYS

U.S. PATENT DOCUMENTS

| | | |
|---|---|---|
| 5,850,352 A | 12/1998 | Moezzi et al. |
| 5,929,951 A | 7/1999 | Sasakura et al. |
| 5,953,664 A | 10/1999 | Kumar et al. |
| 6,064,353 A | 5/2000 | Hoshi |
| 6,141,036 A | 10/2000 | Katayama et al. |
| 6,141,145 A | 10/2000 | Nalwa |
| 6,157,747 A | 12/2000 | Szeliski et al. |
| 6,252,707 B1 | 6/2001 | Kleinberger et al. |
| 6,275,254 B1 | 8/2001 | Beeteson et al. |
| 6,278,480 B1 | 8/2001 | Kurahashi et al. |
| 6,301,447 B1 | 10/2001 | Jackson et al. |
| 6,331,871 B1 | 12/2001 | Taylor |
| 6,459,451 B2 * | 10/2002 | Driscoll et al. ............. 348/335 |
| 6,611,282 B1 * | 8/2003 | Trubko et al. ............... 348/36 |
| 2002/0005921 A1 | 1/2002 | Sasakura et al. |

\* cited by examiner

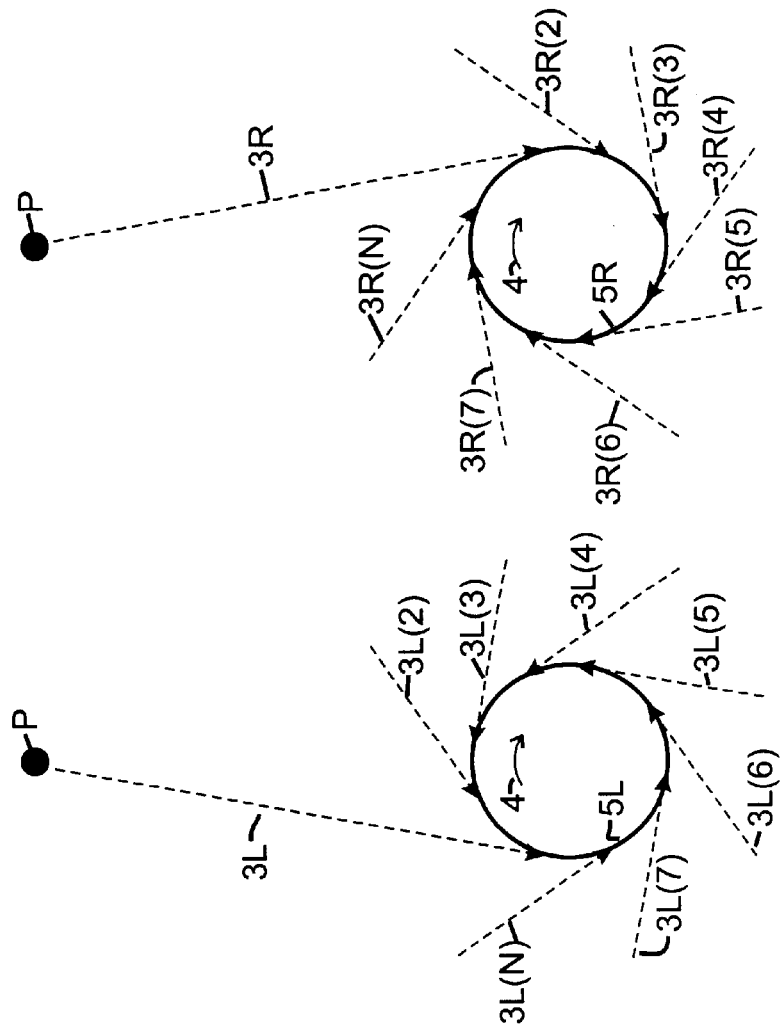
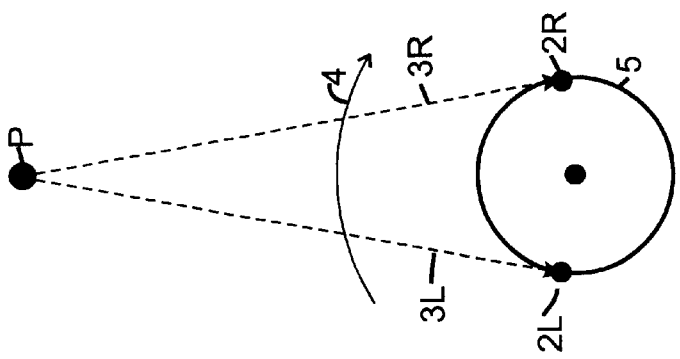

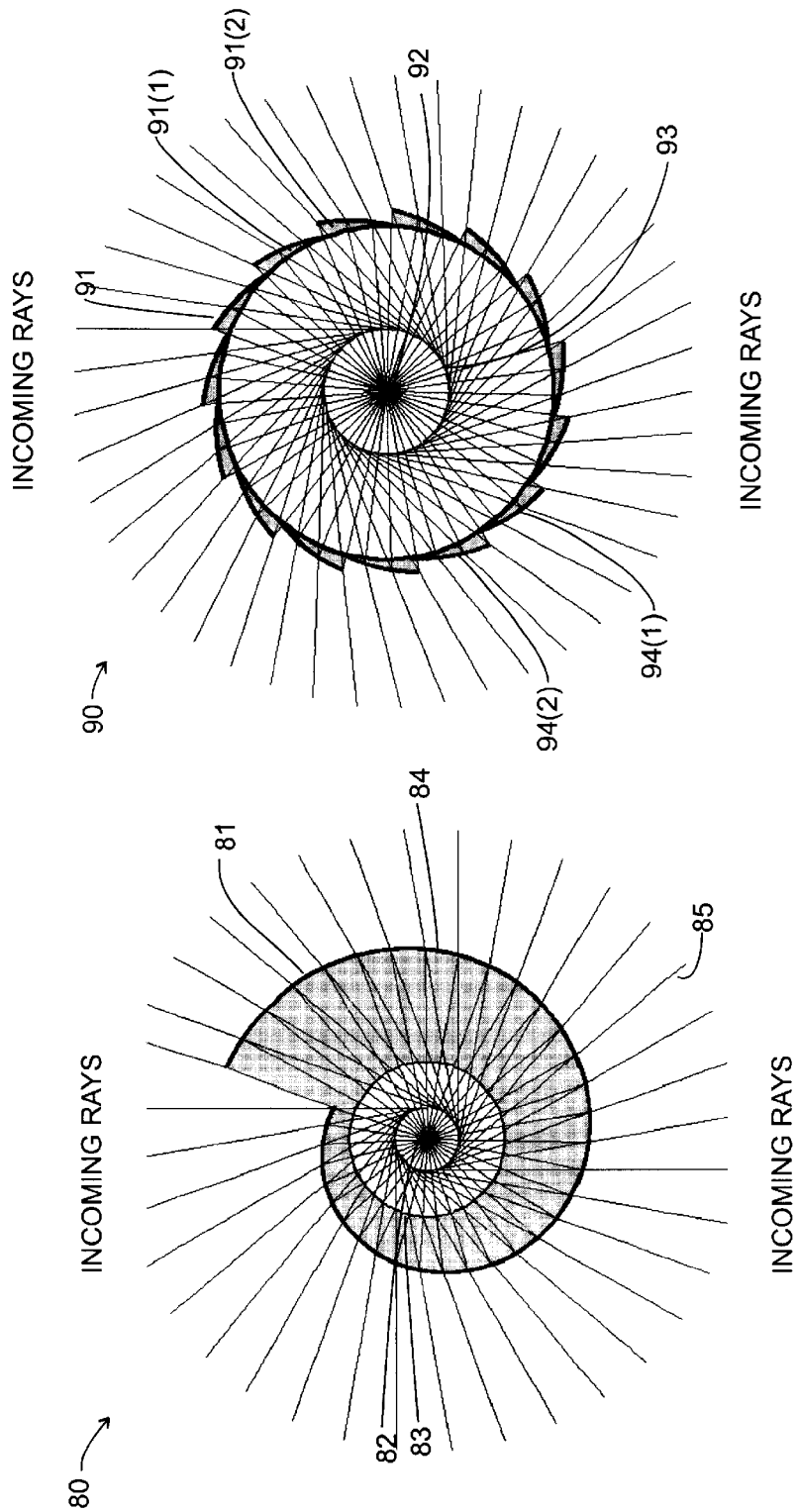

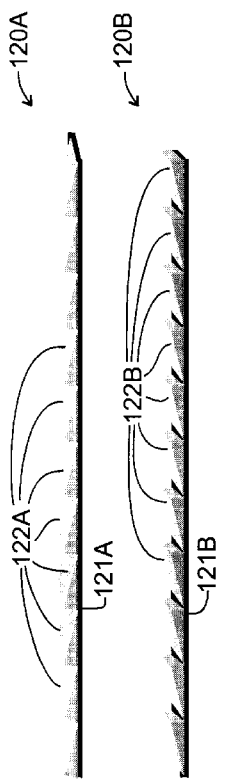
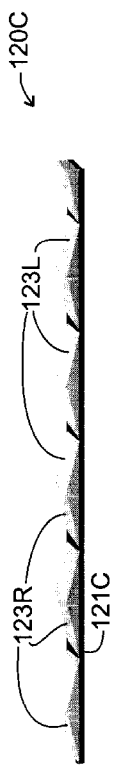
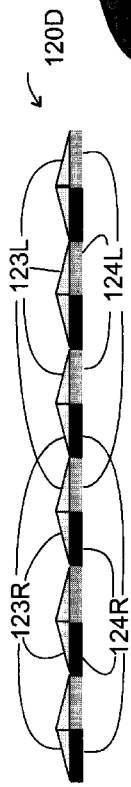
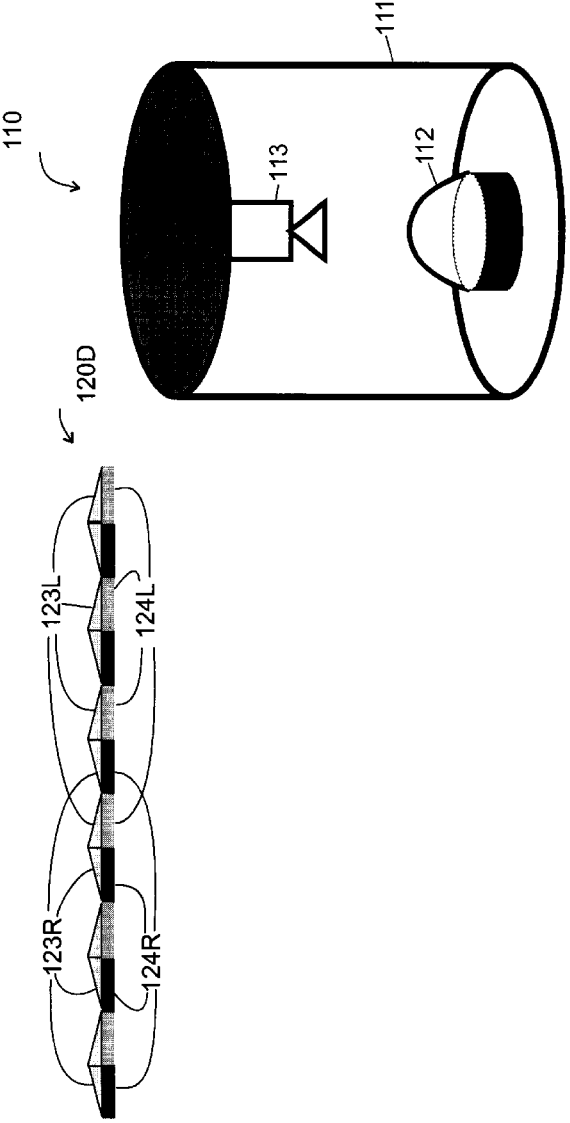
FIG. 11
FIG. 12A
FIG. 12B
FIG. 12C
FIG. 12D

STEREO PANORAMIC CAMERA ARRANGEMENTS FOR RECORDING PANORAMIC IMAGES USEFUL IN A STEREO PANORAMIC IMAGE PAIR

This application is a continuation-in-part of U.S. patent application Ser. No. 09/396,248, filed Sep. 16, 1999, in the name of Shmuel Peleg, et al., entitled System and Method for Generating and Displaying Panoramic Images and Movies, assigned to the assignee of the present application, incorporated by reference.

Priority is hereby claimed based on application Ser. No. 60/168,422, filed November 29, 1999; application Ser. No. 60/174,099, filed Dec. 31, 1999; and application Ser. No. 60/198,381, filed Apr. 19, 2000.

FIELD OF THE INVENTION

The invention relates generally to the field of recording images, and more particularly to stereo panoramic camera arrangements for recording of panoramic images useful in a stereo panoramic image pair. In addition, the invention relates to camera arrangements for recording individual panoramic images, which may be used in the stereo panoramic camera arrangements.

BACKGROUND OF THE INVENTION

Panoramic images are images of a scene having a wide field of view, up to a full 360°. Panoramic images may be recorded using a wide angled lens, a mirror, or the like, providing a wide field of view. Panoramic images having a wider field of view can be generated by, for example, recording a plurality of images around a particular point and, using conventional mosaicing techniques, generating a single mosaic image. Panoramic images may also be generated of simulated scenes using conventional computer graphics techniques. Stereoscopic panoramic images can also be generated from images using various techniques known to those skilled in the art. In one technique, described in Joshua Gluckman, et al., "Real-Time Omnidirectional And Panoramic Stereo," DARPA Image Understanding Workshop, 1998, two omnidirectional cameras, vertically displaced along a common axis, record panoramic images of the surrounding scene. Since the cameras are displaced, the pair of images recorded by the cameras, when considered in combination, will provide depth information for objects in the scene surrounding the cameras. However, since the displacement is vertical, the recorded images are inappropriate for human stereo panoramic perception.

SUMMARY OF THE INVENTION

The invention in one aspect provides new and improved stereo panoramic camera arrangements for recording of panoramic images useful in a stereo panoramic image pair. In addition, the invention provides new and improved camera arrangements for recording individual panoramic images, which may be used in the stereo panoramic camera arrangements.

In brief summary, the invention, in one aspect, provides a camera arrangement comprising a camera and an optical element. The camera is configured to record an image defined by light rays directed thereto. The optical element is configured to deflect rays from a scene to the camera for recording thereby. The optical element is further configured to deflect the rays such that, if the rays were undeflected, the rays would instead be tangent to a viewing device of predetermined shape, such as a circle. Optical elements may be in the form of curved mirrors or lenses.

The camera arrangements are configured to record images in the form of left or right panoramic images of a stereo panoramic image pair, and in another aspect, the invention provides a stereo panoramic camera arrangement including one or more camera arrangements, for contemporaneously recording both left or right panoramic images of a stereo panoramic image pair.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 1A and 1B are useful in understanding operations performed by arrangements for recording panoramic images useful in stereoscopic panorama image pairs constructed in accordance with the invention, and in particular in connection with understanding the use of a viewing circle in connection with recording of panoramic images for use as a stereoscopic panoramic image pair;

FIG. 8 schematically depicts an illustrative camera arrangement including an optical element in the form of a lens for recording images that may be used as the left or right panoramic image in a stereo panoramic image pair; and FIG. 9 schematically depicts a second embodiment of an illustrative camera arrangement including an optical element in the form of a lens for recording images that may be used as the left or right panoramic image in a stereo panoramic image pair;

FIG. 11 schematically depicts an illustrative camera arrangement that can be used in the stereo panoramic camera arrangement depicted in FIG. 10, the camera arrangement including an optical element in the form of a cylindrical Fresnel-like lens arrangement;

FIGS. 12A through 12D schematically depict cross-sections of portions of respective optical element that are useful in connection with the camera arrangement depicted in FIG. 11;

DETAILED DESCRIPTION OF AN ILLUSTRATIVE EMBODIMENT

Figure 3:
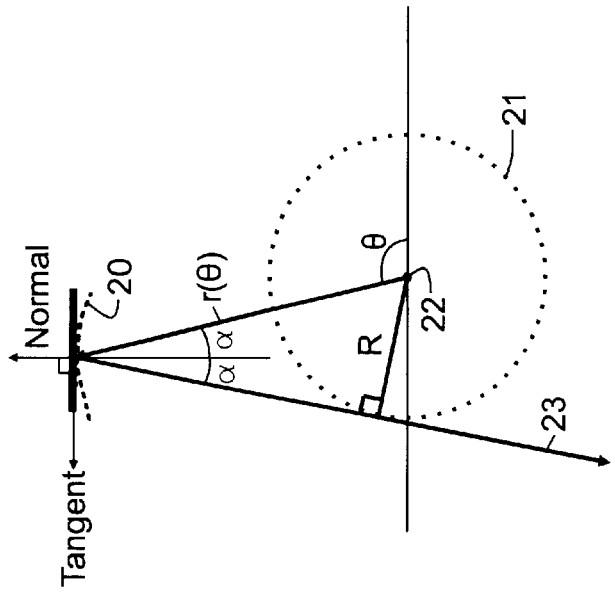
FIG. 3 is useful in connection with describing the structure of the curved mirror schematically depicted in FIG. 2.

The invention provides, in one aspect, stereo panoramic camera arrangements for recording of panoramic images useful in a stereoscopic ("stereo") panoramic image pair. In addition, the invention relates to camera arrangements for recording individual panoramic images, which may be used in the stereo panoramic camera arrangements. Before describing the new camera arrangement, it would be helpfull to first describe what a stereoscopic panoramic image is and generally how the various systems and methods described herein generate the stereoscopic panoramic images and facilitate their display. This will be done in connection with FIGS. 1A and 1B. With reference initially to FIG. 1A, that FIG. schematically depicts an observer, and, particularly, eyes represented by dots 2L and 2R (generally identified by reference numeral "2L/R") standing vertically and observing a point P in a scene. The observer sees point P by means of rays of light reflected from the point and directed toward the eyes 2L and 2R along respective rays represented by dashed arrows 3L and 3R. It will be appreciated that, since the viewpoints 2L and 2R are separated in a direction perpendicular to the viewing direction, the observer will be able to observe a depth in connection with the region of the scene at and near point P.

The observer typically can see only a small portion of the 360° panorama around himself or herself. To see more of the panorama, the observer will rotate his or her head in, for example, the direction indicated by the arrow identified by reference numeral 4. Rotation of the head will allow the observer to view other points (not shown) in the scene, along rays (also not shown) that rotate with him or her. If the observer rotates around a full 360°, each eye will revolve around the same viewing circle 5.

It will be apparent from FIG. 1A that the succession of images as seen by the observer's two eyes as he or she rotates, can be separated into separate sets of images, with one set of images being associated with each eye. This will be described in connection with FIG. 1B. FIG. 1B, depicts the viewing circle 5 divided into separate viewing circles 5L and 5R (generally 5L/R) for the respective left and right eyes, with point P being shown in the same position as in FIG. 1A, with respect to each viewing circle 5L/R, and the associated ray 3L(1) and 3R(1), which correspond to rays 3L and 3R depicted in FIG. 1A. Each viewing circle 5L/R also depicts other rays, identified by reference numerals 3L(2), ..., 3L(N) (generally identified by reference numeral 3L(n)) and 3R(2), . . . , 3R(N) (generally identified by reference numeral 3R(n)) that represent images that the respective left and right eyes of the observer will receive of the various points in the scene as he or she rotates in the direction represented by arrows 4L and 4R.

Further in connection with FIG. 1B, to facilitate the viewing of a stereoscopic panoramic image of the scene by a viewer, the images as would be received by each of the observer's eyes can be separately recorded and viewed by, or otherwise displayed to, the respective eyes of the viewer. Thus, if, for example, images are recorded around a circle corresponding to viewing circle 5L at successive points, in successive direction depicted by rays 3L(1), . . . 3L(N), and the images mosaiced together, and further images are recorded around a circle corresponding to viewing circle 5R at successive points, in successive direction depicted by rays 3R(1), . . . 3R(N), and if those images are suitably aligned (such that the point of intersection of the rays 3L(n) and 3R(n) are viewed in the same relative location) and displayed to respective eyes of a viewer, the viewer can see a stereoscopic panoramic image of the scene.

In a similar manner, stereoscopic panoramic images can be generated using computer b graphics techniques. However, instead of the regular perspective projection used in conventional image rendering, the panoramic image for the left eye will be rendered using rays tangent to a circle such as viewing circle 5L, and the panoramic image for the right eye will be rendered using rays tangent to a circle such as viewing circle 5R.

As noted above, in one aspect, the invention provides several stereo panoramic camera arrangements for recording of panoramic images useful in a stereo panoramic image pair. Embodiments of this aspect of the invention will be described in connection with FIGS. 7, 10 and 13. In another aspect, the invention provides camera arrangements for recording of images for use in generating panoramic mosaic images which may be used as left or right panoramic images of a stereo panoramic image pair, and which may be used in the stereo panoramic camera arrangements described in connection with FIGS. 7, 10 and 13. Each camera arrangement includes a curved optical element such as a mirror or lens to provide a relatively wide field of view. For the camera arrangements, embodiments in which the optical element is a mirror, will be described in connection with FIGS. 2 through 7, and embodiments in which the optical element is a lens, will be described in connection with FIGS. 8, 9, 11 and 15.

Figure 2:
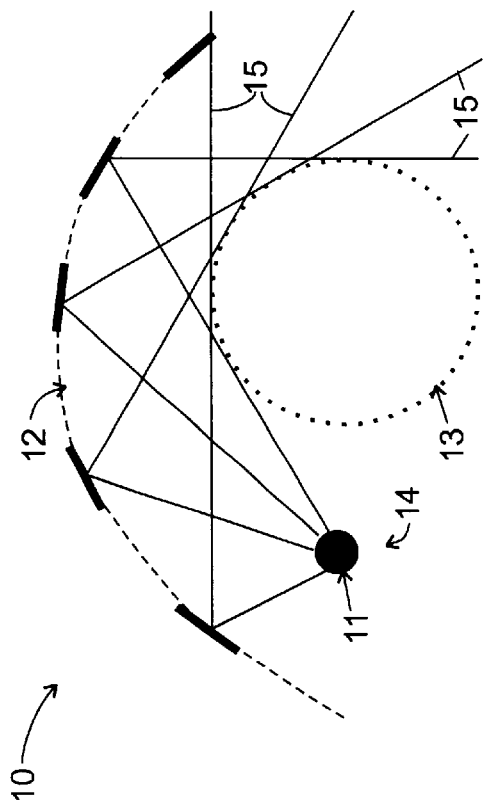
FIG. 2 schematically depicts an illustrative camera arrangement including an optical element in the form of a curved mirror for recording images that may be used as the left or right panoramic image in a stereo panoramic image pair.

With reference to FIG. 2, the camera arrangement 10 includes a camera 11 and a curved mirror 12. The camera 11 is directed towards the curved mirror 12 and can record images reflected therefrom. Conventional cameras record images on an image plane using a perspective projection, in which all light rays approximately pass through a single point, which is referred to as the optical center of the camera. Point 14 represents the optical center of camera 11. The shape of the curved mirror 12 can be determined for a selected optical center positioned relative to a selected viewing circle. This will be described with further reference to FIG. 2. As shown in FIG. 2, the viewing circle is identified by reference numeral 13 and the optical center of camera 11 is identified by reference numeral 14. As shown in FIG. 2, rays 15 that are tangent to the viewing circle are reflected by the mirror toward the camera's optical center 14, and may be recorded by the camera 11 as an 13 image. It will be appreciated that the rays recorded by the camera 11 are tangent to an image circle, as described above in connection with FIGS. 1A and 1B, and so the image recorded by the camera 11 can be used, along with other images recorded at respective angular orientations to an axis, in generating one mosaic panoramic image of a stereo panoramic image pair, as will be described below in connection with FIG. 6. The shape of the curved mirror 12 will be described in connection with FIG. 3.

FIG. 3 depicts a mirror patch 20 comprising a small portion of the mirror 12, and a viewing circle 21 displaced therefrom. In the illustrative arrangement depicted in FIG. 3, the optical center 22 is positioned at the center of the viewing circle, although as described below, the optical center may be positioned elsewhere. If the radius of the viewing circle is denominated "R" and if the vector from the optical center 22 to the mirror patch 20 is denominated $\bar{r}(\theta)$ at direction $\theta$ relative to an axis horizontally disposed in FIG. 3. The distance "r" between the optical center 22 and the mirror at direction $\theta$ is $r=r(\theta)=\|\bar{r}\|$. In that case, the ray conditions for a ray 23 that is tangent to the viewing circle and that, after reflection from the mirror patch 20, passes through the optical center 22, can be written $$R = \|\bar{r}\|\sin(2\alpha) = \|\bar{r}\|\sin(\alpha)\cos(\alpha) \quad (1)$$

$$\sin(\alpha) = \frac{|N \times \bar{r}|}{\|\bar{r}\| \cdot \|N\|}$$

$$\cos(\alpha) = \frac{(N, \bar{r})}{\|\bar{r}\| \cdot \|N\|},$$

where $N \times \bar{r}$ is the cross product of the vector N that is the normal to the tangent of the mirror a patch 20 at the point at which vector r intercepts the mirror patch 20, and $(N, \bar{r})$ is the dot, or inner, product between the vectors. Using the ray conditions in equation (1), if $$\rho = \rho(\theta) = \frac{r(\theta)}{R},$$

then $$2\rho^2 \frac{\partial \rho}{\partial \theta} = \left(\frac{\partial \rho}{\partial \theta}\right) + \rho^2. \quad (2)$$

Equation (2) has two possible solutions:

$$\frac{\partial \rho}{\partial \theta} = \rho^2 + \rho\sqrt{\rho^2 - 1} \quad (3)$$

$$= \rho^2 - \rho\sqrt{\rho^2 - 1}$$

The curve defined by p is obtained by integrating equation (3) over angle $\theta$. The appropriate solution is $$\theta = \rho + \sqrt{\rho^2 - 1} + \arctan\left(\frac{1}{\sqrt{\rho^2 - 1}}\right). \quad (4)$$

It will be appreciated that the value of "$\rho$" will need to be greater than "one," which means that, if the optical center is at the center of the viewing circle 21, all of the mirror patches comprising the mirror 12 will need to be outside of the viewing circle 21.

The shape of the curved mirror defined by equation (4) can be represented in conventional rectangular coordinates and parametric form as follows:

$$x = \frac{\sin(t)(R^2 + p_1^2 - R^2 t^2 + p_2^2) - 2p_2 R - 2R^2 t\cos(t)}{2(-p_2\cos(t) - Rt + \sin(t)p_1)} \quad (5)$$

$$x = \frac{-\cos(t)(R^2 + p_1^2 - R^2 t^2 + p_2^2) - 2p_2 R - 2R^2 t\sin(t)}{2(-p_2\cos(t) - Rt + \sin(t)p_1)},$$

where $(x,y)=(x(t),y(t))$ are coordinates of the points comprising the curved mirror 12, "t" is the parameter, the "x" and "y" coordinates of the optical center are given by $(p_1,p_2)$, and the center of the viewing circle 21 is at the origin of the rectangular coordinate system. It will be appreciated that, if the optical center 22 is at the center of the viewing circle 21, equation (5) simplifies to $$x = \frac{R(-\sin(t) + 2t\cos(t) + t^2\sin(t))}{2t} \quad (6)$$

$$y = \frac{-R(-\cos(t) - 2t\sin(t) + t^2\cos(t))}{2t}.$$

A curve defined by equations (4) through (6) has the shape of a spiral. It will be appreciated that a the curved mirror 12 will comprise a segment of the spiral selected to insure that the mirror does not obstruct the field of view of the camera 11.

Figure 4B:
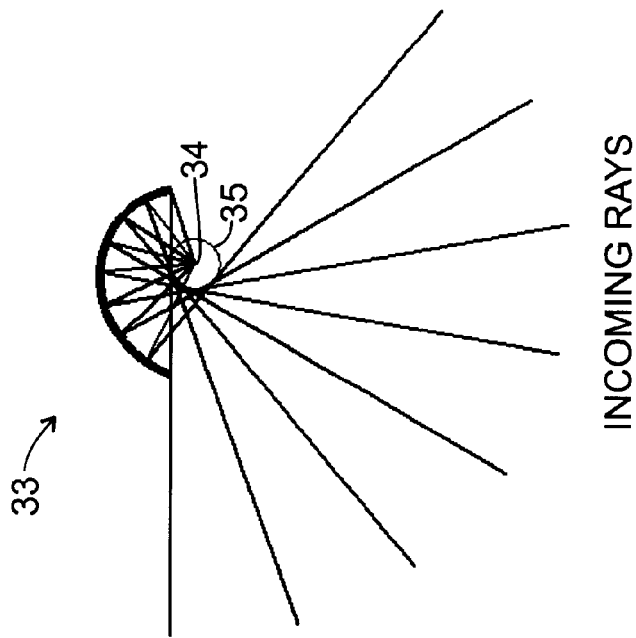
FIGS. 4A and 4B schematically depict two camera arrangements, one (FIG. 4A) in which the optical center of the camera used in the arrangement is outside of the viewing circle, and the other (FIG. 4B) in which the optical center is inside of the viewing circle.
Figure 4A:
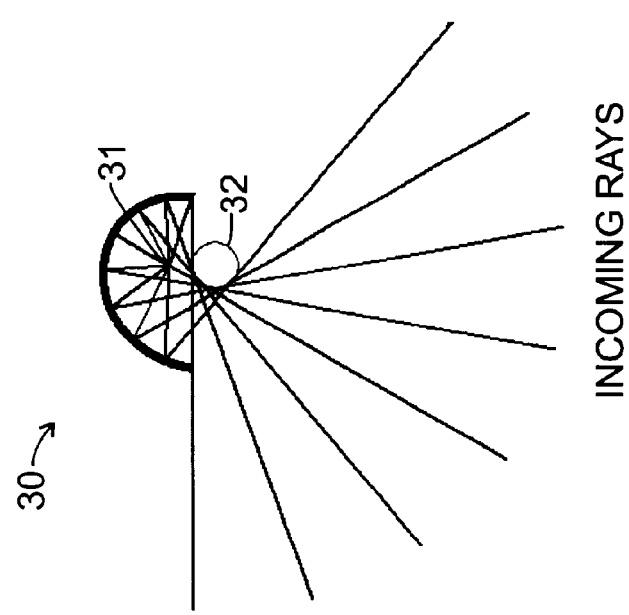

FIGS. 4A and 4B schematically depict two camera arrangements, with FIG. 4A schematically depicting a camera arrangement 30 in which the optical center 31 is outside of the viewing circle 32, and FIG. 4B schematically depicting a camera arrangement 33 in which the optical center 34 is at the center of the viewing circle 35.

Figure 5:
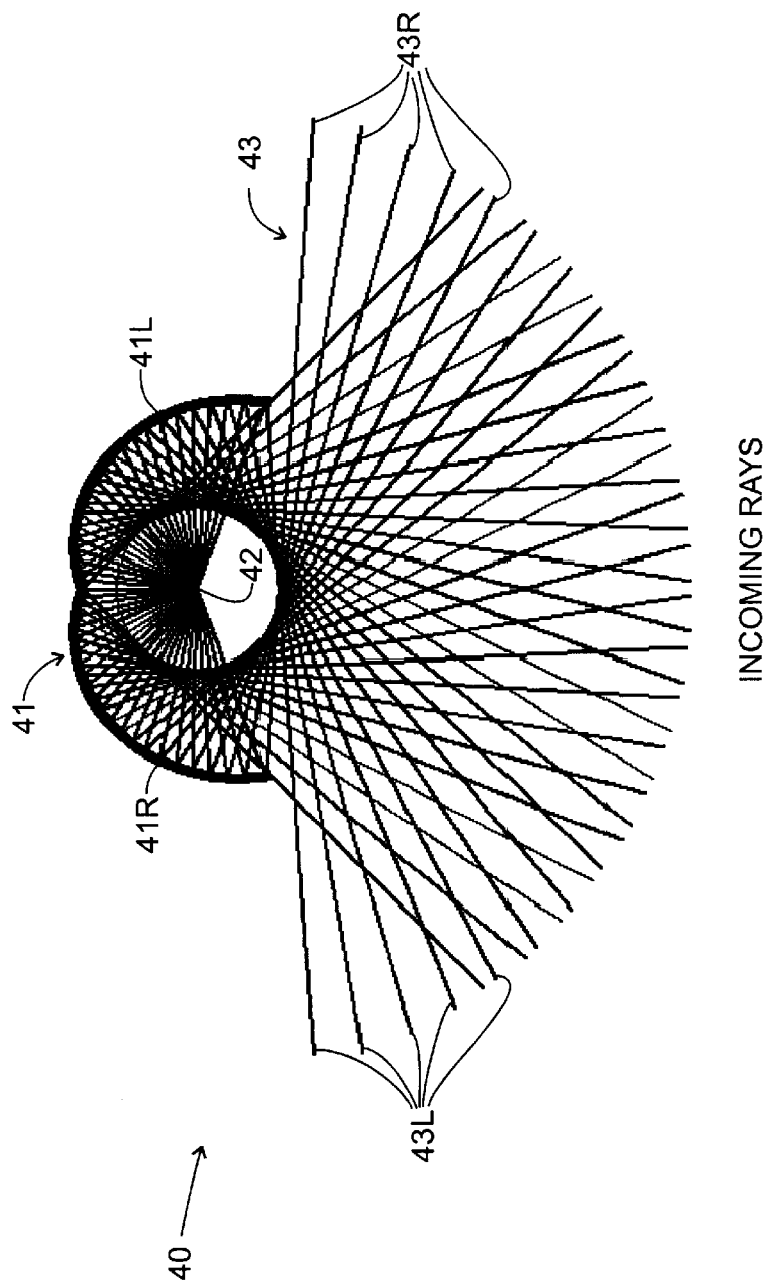
FIG. 5 schematically depicts a stereo panoramic camera arrangement constructed according to the lines of the camera arrangement described in connection with FIGS. 2 through 4B.

As noted above, the camera arrangement described above in connection with FIGS. 2 through 4B can be used in a stereo panoramic camera arrangement for recording images for use in generating stereo panoramic images. Such a stereo panoramic camera arrangement is schematically depicted in FIG. 5. With reference to FIG. 5, the stereo camera arrangement 40 includes a curved mirror 41 having two curved mirror segments 41L and 41R, and a single camera represented by an optical center 42. Each of the curved mirror segments 41L and 41R corresponds to the curved mirror 12 described above in connection with FIG. 2. The curved mirror segments 41L and 41R are mirror images of each other along a vertical mirror axis, as shown in FIG. 5. The curved mirror segments 41L and 41R share a common viewing circle 43, with the optical center 42 being located at the center of the viewing circle, with the aforementioned vertical mirror axis running through the optical center 42. The curved mirror segment 41R, which is disposed to the left of the vertical axis, generally receives rays 43R directed from the right of the scene (not shown) whose image is being recorded, generally corresponding to ray 3R described above in connection with FIG. 1A. Similarly, the curved mirror segment 41L, which is disposed to the right of the vertical axis, generally receives rays 43L directed from the left of the scene whose image is being recorded, generally corresponding to ray 3L described above in connection with FIG. 1A. A camera whose optical center is at optical center 42 can record an image comprising both rays 43L and 43R, which image can be mosaiced with other images recorded with the stereo camera arrangement 40 disposed at other angular orientations around the optical center 42. A suitable camera may comprise, for example, an Omni-Camera, such as those described in T. Kawanishi, et al., "Generation of high-resolution stereo panoramic images by omnidirectional sensor using hexagonal pyramidal mirrors," 14th International Conference On Pattern Recognition, pages 485–489, Brisbane, Australia, August, 1998, IEEE-Computer Society, and S. Nayar, "Catadioptric omnidirectional cameras," IEEE Conference on Computer Vision And Pattern Recognition, pages 482–488, San Juan, June, 1997.

An approximation to the curved mirror 12 in the camera arrangement 10, or the curved mirror segments 41L and 41R, can be provided by collecting a plurality of planar mirrors disposed along a curve. This will be described in connection with FIGS. 6A and 6B. Generally, it will be appreciated that, in a suitable approximation, the planar mirrors should not be positioned so as to occlude each other. In addition, and coverage of the scene whose image is being recorded by the camera arrangement that includes a flat mirror approximation should be continuous along the curve defined by the planar mirror approximation. These conditions will be described in connection with FIG. 6A.

Figure 6B:
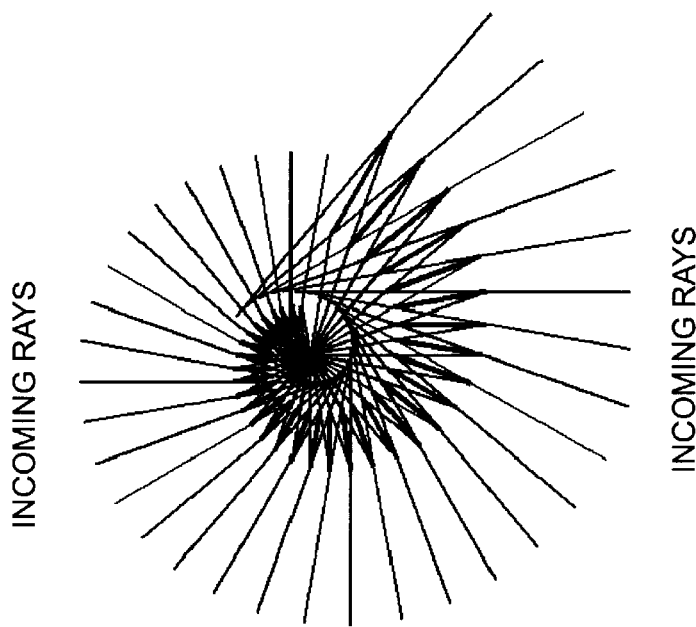
FIGS. 6A and 6B schematically depicts an illustrative camera arrangement including an optical element in the form of a plurality of planar mirrors for recording images that may be used as the left or right panoramic image in a stereo panoramic image pair.
Figure 6A:
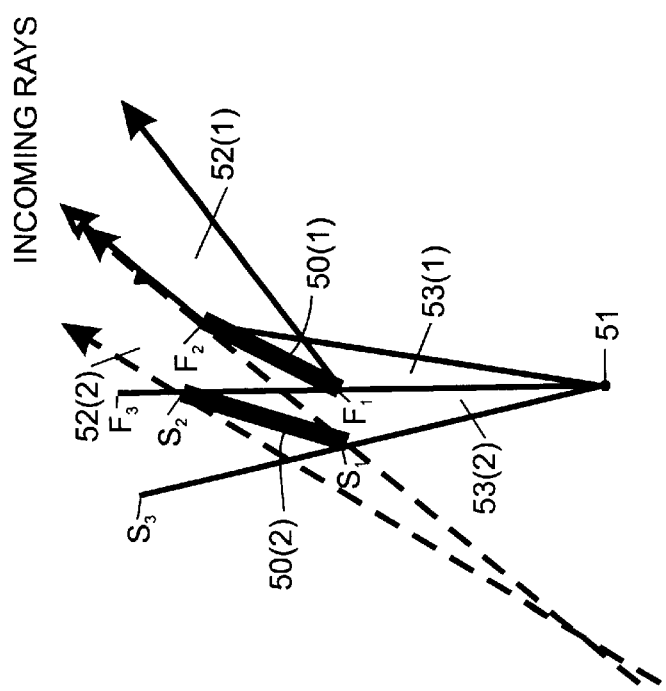

With reference to FIG. 6A, that FIG. depicts two successive flat mirrors 50(1) and 50(2) in the flat mirror approximation 50, and an optical center 51. It will be appreciated that an Omni-Camera would be positioned at the optical 51 to record the images reflected thereto by the respective mirrors 50(1) and 50(2). The rays directed to the mirror 50(1) and reflected therefrom toward the optical 51 are represented by the darkly shaded areas 52(1) and 53(1), respectively, and the rays directed to the mirror 50(2) and reflected therefrom toward the optical 51 are represented by the lightly shaded areas 52(2) and 53(2), respectively. It will be appreciated that, in order for coverage to be continuous, the shaded areas 52(1) and 52(2) will share a common boundary, as shown in FIG. 6A. To ensure that the mirrors 50(1) and 50(2) are disposed at the appropriate position, the ray reflected from the bottom of mirror 50(2) (as shown in FIG. 5A) toward the optical 51 will coincide with the ray reflected from the top of mirror 50(1) (as shown in FIG. 5A) toward the optical center. It will be appreciated that the image reflected from mirror 50(2) will be reversed from that reflected from mirror 50(1), since the ray reflected from the top of mirror 50(1) will be towards the right in the image that will be recorded in the camera, whereas the ray reflected from the bottom of mirror 50(2) will be towards the left in the image. This can be accommodated by processing the image as recorded by the Omni-Camera to reverse the portions thereof comprising the images as reflected from alternating mirrors.

In the following, the points on mirrors 50(1) and 50(2) nearest to the optical 51 will be denoted points $F_1$ and $S_1$, respectively, the point on mirrors 50(1) and 50(2) farthest from the optical 51 will be denoted points $F_2$ and $S_2$, and the lines that include respective points $F_1$ and $S_1$ and the optical center will be deemed to include respective points $F_3$ and $S_3$. In that case, the angle $\beta$ between line segments defined by points $F_3, F_1$ and $F_2, F_1$ will be the same as the angle between line segments defined by points $S_3, S_1$ and $S_2, S_1$. Denoting "R" as the distance from the optical center 51 to the point $F_1$ on mirror 50(1), and "L" as the length of the mirror 50(1), that is, the distance from point $F_1$ to point $F_2$, the position and orientation of mirror 50(2) relative to the optical center 51 are given by $$\alpha = \tan^{-1}\left(\frac{L\sin(\beta)}{L\cos(\beta) + R}\right) \quad (7)$$

$$K = (OF_2) = \sqrt{R^2 + L^2 + 2RL\cos(\beta)}$$

$$R' = \frac{K\sin(2(\beta - \alpha))}{\sin(\beta - \alpha)}$$

$$L' = \frac{R'\sin(\alpha)}{\sin(\beta - \alpha)},$$

where R' is the distance from the optical center to point $S_1$ on mirror 50(2), L' is the length of mirror 50(2), that is, the distance from point $S_1$ to point $S_2$, and $\alpha$ is the angle between the line segment defined by points $S_1$ and the optical 51 and the line segment defined by points $F_1$ and the optical center 51. It should be noted that the angle $\alpha$, will also be the angle between the line segment defined by points $F_1$ and the optical 51 and the line segment defined by points $F_2$, and the optical center; it should be noted that, therefore, angle $\alpha$, together with the length L of the mirror 50(1) will determine the angular orientation of mirror 50(1) with respect to the optical center 51.

With this background, FIG. 6B depicts an illustrative camera arrangement 60 including a planar mirror approximation 61 disposed around an optical center 62. The planar mirror approximation includes a plurality of planar mirrors 61(1), 61(2), . . . disposed around the optical center and at an angle thereto determined as described above in connection with FIG. 6A. Also depicted in FIG. 6B are rays 62(1), 62(2) . . . from a scene (not shown) around the optical center 62, that intersect the respective points at the two ends of the respective mirrors 61(1), 61(2), illustrating that the reflections of the respective rays from the respective mirrors will converge at the optical center as required. An omnidirectional camera disposed at the optical center 62 can record images defined by the rays as reflected from the planar mirrors 61(1), 61(2), . . . As is apparent from FIG. 6B, the planar mirrors 61(1), 61(2), . . . provide continuous coverage of the scene around the optical center, with no gaps, for the entire angular region covered by the planar mirror approximation 61.

Figure 7:
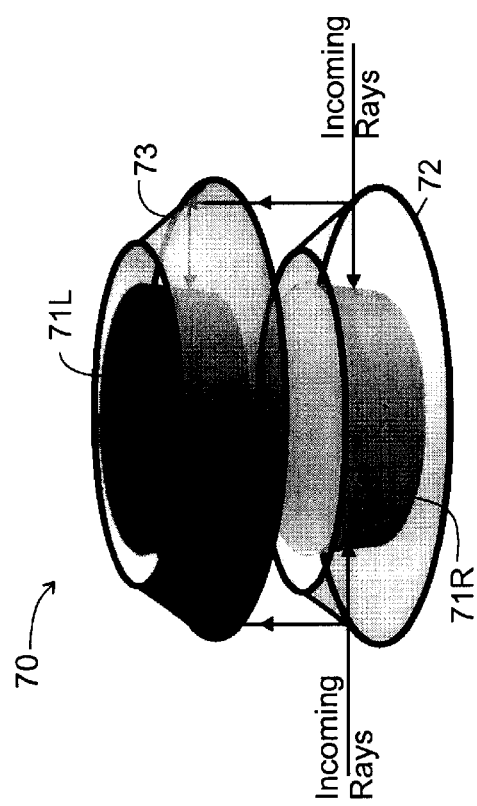
FIG. 7 schematically depicts a stereo panoramic camera arrangement for recording panoramic images for a stereo panoramic image pair.

Returning to FIG. 6A, be apparent by an examination of that FIG. that, with the mirrors 50(1), 50(2) disposed as shown in FIG. 6A, the rays reflected from the mirrors and directed toward the optical 51 will be of a scene (not shown) generally from the left, similar to ray 3L as described above in connection with FIG. 1A. If the mirrors are disposed in the opposite direction relative to the optical center 51, the rays reflected therefrom would be generally from the right of the scene, similar to the ray 3R as described above in connection with FIG. 1A. Accordingly, providing two camera arrangements 60 with the mirrors disposed in opposite directions, two images can be recorded that can be used to in generating a stereo panoramic image pair. This will be described in connection with FIG. 7. FIG. 7 schematically depicts a stereo panoramic camera arrangement 70 including two planar mirror camera arrangements 71L and 71R, a beam splitter 72 and a mirror 73; another embodiment of a stereo panoramic camera arrangement will be described below in connection with FIG. 10. In the embodiment depicted in FIG. 7, the planar mirror camera arrangements are similar to camera arrangement 60 described above in connection with FIG. 6B, with the planar mirrors being disposed in opposite directions, with the planar mirror camera arrangement 71R recording the panoramic image of the panoramic image pair for the right eye and the planar mirror camera arrangement 71L recording the panoramic image for the left eye. The beam splitter 72 and mirror 73 are generally conical, with their axes and the optical centers of the planar mirror camera arrangements 71L and 71R being disposed along a common axis 74. One planar mirror camera arrangement, illustratively arrangement 71R, is surrounded by the beam splitter 72, and the other arrangement, illustratively arrangement 71L, is surrounded by the mirror 73. Rays 75 from a scene (not shown) directed to the beam splitter 73 are split, with a portion of each ray being going through the beam splitter 72 and a portion being reflected upwardly toward the mirror 73. The portion of each ray that goes through the beam splitter 72 is directed at the planar mirror camera arrangement 71R, and the mirror 73 reflects the portion of the ray reflected thereto toward the planar mirror camera arrangement 71L.

The camera arrangements described above in connection with FIGS. 2 through 6 have made use of optical elements in the form of mirrors. As noted above, the optical element used in a camera arrangement may instead comprise a lens.

Camera arrangements in which the optical element is in the form of a lens will be described in connection with FIGS. 8 and 9. FIG. 8 depicts a camera arrangement in which the optical element is a lens with continuous surfaces, and FIG. 9 depicts a camera arrangement in which the optical is a Fresnel-like lens with a discontinuous exterior surface. With reference to FIG. 8, that FIG. depicts a camera arrangement 80 including a lens 81 disposed around a camera represented by an optical center 82. The lens 81 has an interior surface 83 that is in the form of a cylinder having an axis that corresponds to the optical center 82. The lens also has an exterior surface 84 that is configured to refract rays, which are generally identified by reference numeral 85, from a scene (not shown) toward the optical center 82. The rays, as refracted by the exterior surface 84, are directed orthogonally to the cylindrical interior surface 83 and thus are not further refracted thereby along the path to the optical center. As also shown in FIG. 8, the rays, if they had not been bent by the exterior surface 84, would form a viewing circle 86. It will be appreciated that the shape of the exterior surface 84 will depend on the size of the viewing circle 86 and the index of refraction of the material comprising lens 81. An image defined by the rays 85 can be recorded by an omnidirectional camera positioned at the optical center 82.

It will be appreciated that, and with reference also to FIG. 1B, the camera arrangement 80, with the lens 81 disposed as depicted in FIG. 8, is configured to record a right panoramic image of a stereo panoramic image pair. It will be further appreciated that a camera arrangement configured to record camera arrangement can be provided configured to record a left panoramic image of a stereo panoramic image pair that has a lens configured to have a mirror image of the lens 81 described in connection with FIG. 8. In addition, a stereo panoramic camera arrangement can be provided similar to that described above in connection with FIG. 7, provided that the camera arrangement 80 described above in connection with FIG. 8 be used instead of the right planar mirror camera arrangement 71L and a camera arrangement configured to record a left panoramic image (that is, a camera arrangement in which the lens is the mirror image of lens 81) is used instead of the right planar mirror camera arrangement 71R.

As noted above, a camera arrangement may include, instead of a lens 81 with a continuous exterior surface 84, a Fresnel-like lens, which has a discontinuous exterior surface. An illustrative camera arrangement 90 is depicted in FIG. 9. With reference to FIG. 9, camera arrangement 90 includes a Fresnel-like lens 91 around a camera represented by optical center 92. As with the camera arrangement 80, the camera may comprise an omnidirectional camera positioned at the optical center 92 configured to record the image directed thereto by the lens 91. The lens 91 consists of a plurality of lens segments 91(1), 91(2), . . . (generally identified by reference numeral 91 (s)) which form a lens 91 that has a smoothly continuous interior surface 93 and a discontinuous exterior surface comprising surface elements 94(1), 94(2), . . . (generally identified by reference numeral 94(s)) each associated with one of the lens segments 91(s). As with lens 81 (FIG. 8), the continuous interior surface is in the form of a cylinder that is centered on an axis that includes the optical center 92. Each exterior surface 94(s) is configured to refract rays directed thereto from a scene toward the optical center 92 in a manner such that, had the rays not been refracted, they would be tangent to a viewing circle 95. It will be appreciated that, since the refracted rays are directed toward the optical center 92, they will be orthogonal to the interior surface 93 and hence will not be refracted thereby. As with lens 81, the shapes of the exterior surface elements 94(s) will depend on the size of the viewing circle 86 and the index of refraction of the material comprising each lens segment 91(s).

It will be appreciated that, and with reference also to FIG. 1B, the camera arrangement 90, with the lens 91 disposed as depicted in FIG. 9, is configured to record a right panoramic image of a stereo panoramic image pair. It will be further appreciated that a camera arrangement configured to record camera arrangement can be provided configured to record a left panoramic image of a stereo panoramic image pair that has a lens configured to have a mirror image of the lens 91 described in connection with FIG. 9. In addition, a stereo panoramic camera arrangement can be provided similar to that described above in connection with FIG. 7, provided that the camera arrangement 90 described above in connection with FIG. 9 be used instead of the left planar mirror camera arrangement 71L and a camera arrangement configured to record a right panoramic image (that is, a camera arrangement in which the lens is the mirror image of lens 91) is used instead of the right planar mirror camera arrangement 71R.

Figure 10:
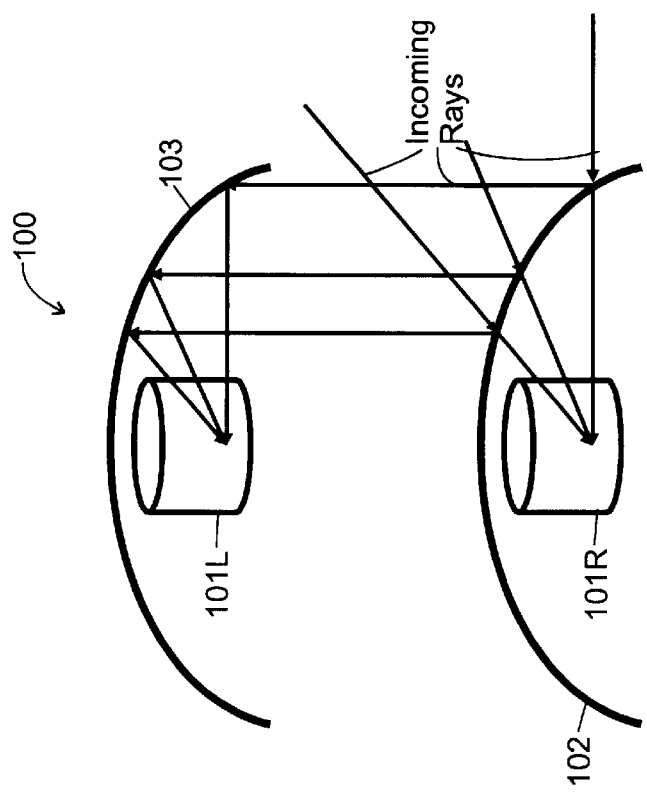
FIG. 10 schematically depicts a second embodiment of a stereo panoramic camera arrangement for recording panoramic images for a stereo panoramic image pair.

FIG. 10 depicts a second embodiment of a stereo panoramic camera arrangement (reference FIG. 7), which will be identified by reference numeral 100. The stereo panoramic camera arrangement 70 described above in connection with FIG. 7 makes use of a beam splitter 72 and a mirror 73, both of which are effectively in the form of frustums of cones, to direct images to respective camera arrangements 71L and 71R for recording images for a stereo panoramic image pair. The stereo panoramic camera arrangement 100 also makes use of a beam splitter 102 and a mirror 103 for directing rays to respective left and right cameras 101L and 101R, but instead of being frustums of cones, the beam splitter 102 and mirror 103 are both parabolic. As with beam splitter 72, the beam splitter 102 splits rays incident thereon, with a portion of each ray being directed to the camera 101R and a second portion being reflected directed upwardly toward the mirror 103. Similarly, as with mirror 73, the mirror 103 reflects rays directed thereto by the beam splitter 102 to camera 101L.

FIG. 11 schematically depicts a camera arrangement, identified by reference numeral 110, that can be used as, for example, camera 101L and/or 101R (FIG. 10) in the stereo panoramic camera arrangement 100. With reference to FIG. 11, the camera 110 comprises a generally cylindrical optical element 111 surrounding a generally parabolic omnidirectional mirror 112 and a camera 113. The omnidirectional mirror 112 and camera 13 together comprise an omnidirectional camera. The axis of the omni-directional mirror 112 and optical axis of camera 113 both coincide with the axis of the optical element 111. The omnidirectional mirror 112 reflects light rays that impinge thereon toward the camera 113, which records the reflected rays as an image, as is conventional in an omnidirectional camera.

The optical element 111 used in the camera arrangement 110 is preferably a Fresnel-like lens, which has characteristics that will be described in connection with FIGS. 12A through 12D. Generally, the Fresnel-like character of the optical element 111 enables it to bend the light rays from straight line paths toward the optical element's axis, so as to provide a viewing circle such as described above in connection with FIG. 1B. FIGS. 12A through 12D depict cross-sections of portions 120A through 120D of optical elements that may be used as optical element 111 in the camera 110. Portions 120A and 120B depict cross-sections of optical elements that may be used in connection with providing respective left and right panoramic images of a stereo panoramic image pair. As shown in FIGS. 12A and 12B, each portion 120A, 120B has a smooth lower surface 121A, 121B, and a sawtooth upper surface 122A, 122B. However, when they form part of optical element 111, for portion 120A, 120B, the lower surface 121A, 121B will form the interior of the optical element and, thus will be positioned towards the interior of the camera arrangement 110. Accordingly, it will be appreciated that, in the optical element 111, the lower surface 121A, 121B will actually be in the form of a smooth cylinder, and not a plane. The sawtooth upper surface 122A, 122B will form the exterior of the optical element 111, with the sawtooth elements oriented so as to run parallel to the axis of the optical element 111, and, accordingly, parallel to the axis of the parabolic omnidirectional mirror 112 and the optical axis of the camera 113. It will be appreciated that, when used in optical element 111, the sawtooth upper surface 122A, 122B will typically be curved. The angle of each sawtooth in the upper surface 122A, 122B, relative to the lower surface 121A, 121B, at each point is such as to refract light rays from a scene external to the camera arrangement 110 that would otherwise be directed toward a viewing circle (reference FIG. 1B), toward the axis of the cylindrical optical element 111. It will be appreciated that, the omnidirectional mirror 112 will reflect the light rays directed toward that axis toward the camera 113, and so, when the camera 113 records an image, the image will conform to the image of the viewing circle. With reference to FIGS. 12A and 1B, it will be appreciated that the orientation of the sawtooth upper surface 122A is such that, if camera arrangement 110 has a cylindrical optical element 111 with such an upper surface 122A, the camera arrangement will record a left panoramic image of a stereo panoramic image pair. On the other hand, with reference to FIGS. 12B and 1B, the orientation of the sawtooth upper surface 122B is such that, if camera arrangement 110 has a cylindrical optical element 111 with such an upper surface 122B, the camera arrangement will record a right panoramic image of a stereo panoramic image pair.

FIG. 12C depicts a portion 120C that is in the form of an interlaced Fresnel lens, which has interlaced elements from both portions 120A and 120B, and which can enable a single camera arrangement 110 to record both left and right panoramic images of a stereo panoramic image pair. This can be accomplished as shown in FIG. 12D. With reference to FIG. 12D, the portion 120D includes interlaced left and right sawtooth elements 123L, 123R. Each sawtooth element 123L, 123R is provided with a tagging element 124L, 124R that will allow light rays from respective left and right sawtooth elements 123L, 123R to be disambiguated by the camera 113, such that the camera 113 will be able to record one image comprising only rays from the left sawtooth elements 123L and another image comprising only rays from the right sawtooth elements 123R. A number of types tagging elements 124L, 124R may be used, including shutters, polarizers, and other arrangements as will be appreciated by those skilled in the art. For example, if shutters are used, when the camera 113 is to record a left panoramic image of a stereo panoramic image pair, all of the shutters comprising tagging elements 124L will be open and all of the shutters comprising tagging elements 124R will be closed. In that condition, when the camera 113 records an image, the image will be only of rays that are refracted through the left sawtooth elements 123L. On the other hand, when the camera 113 is to record a right panoramic image of a stereo panoramic image pair, all of the shutters comprising tagging elements 124R will be open and all of the shutters comprising tagging elements 124L will be closed. In that condition, when the camera 113 records an image, the image will be only of rays that are refracted through the right sawtooth elements 123R. Accordingly, it will be appreciated that, in order to record both panoramic images of a stereo panoramic image pair, the camera 113 will need to record two successive images, one in which the shutters comprising tagging elements 124L are open and the shutters comprising tagging elements 124R are closed (thereby to provide the left panoramic image of the stereo panoramic image pair), and the other in which the shutters comprising tagging elements 124R are open and the shutters comprising tagging elements 124L are closed (thereby to provide the right panoramic image of the stereo panoramic image pair).

Figure 13:
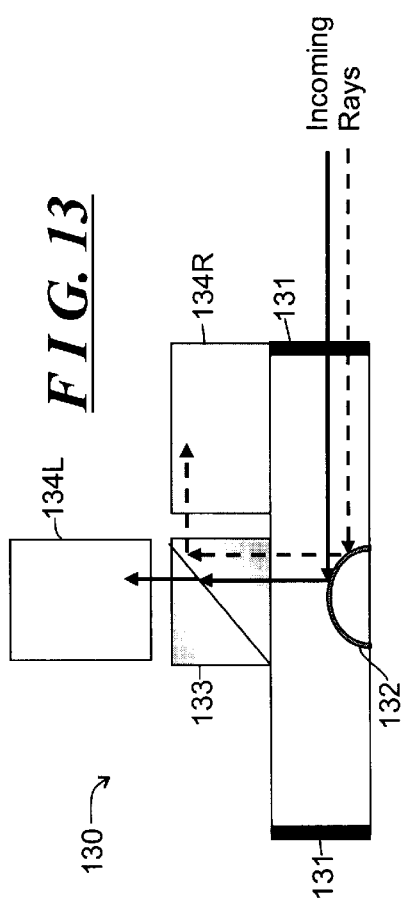
FIG. 13 schematically depicts a third embodiment of a stereo panoramic camera arrangement for recording panoramic images for a stereo panoramic image pair.

On the other hand, if polarizers are used as tagging elements 124L, 124R, left and right panoramic images, both left and right panoramic images of a stereo panoramic image pair can be recorded simultaneously. A camera arrangement that can simultaneously record both left and right panoramic images of a stereo panoramic image pair will be described in connection with FIG. 13. FIG. 13 schematically depicts a camera arrangement 130 that can simultaneously record both left and right panoramic images of a stereo panoramic image pair. With reference to FIG. 13, camera arrangement 130 includes an optical element 131 constructed as described above in connection with FIG. 12D, an omnidirectional mirror 132, a cube polarizing beam splitter 133 and two cameras 134L and 134R. As described above, the optical element 131 will provide rays from respective tagging elements 124L, 124R with opposing polarizations, illustratively vertical for tagging elements 124L and horizontal for tagging elements 124R. The rays as reflected by the omnidirectional mirror 132 will maintain their respective horizontal or vertical polarizations. The cube polarizing beam splitter 133 is configured to allow light of one polarization, illustratively, vertical, to pass through and be received by the camera 134L, and to reflect light of the other polarization, illustratively horizontal, to be reflected and be recorded by the camera 134R. Accordingly, the rays directed to respective cameras 134L and 134R will be that provided by respective left and right sawtooth elements 123L and 123R. The cameras 134L and 134R can thus be actuated in unison to record respective left and right panoramic images of a stereo panoramic image pair.

Figure 14:
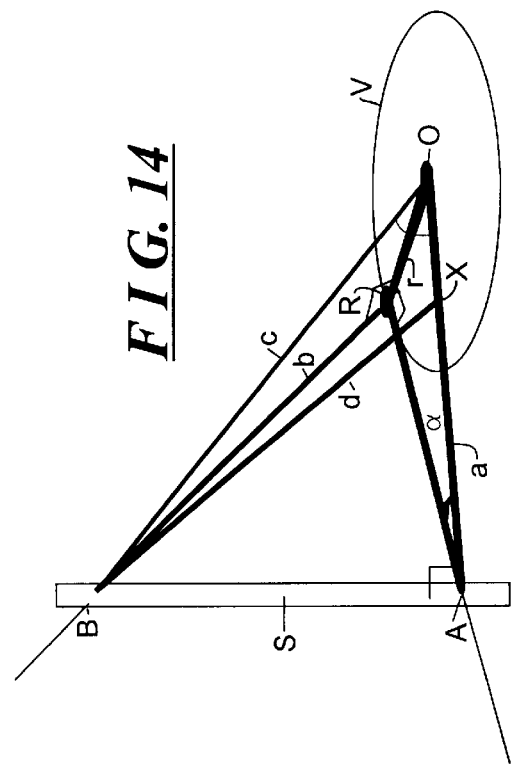
FIG. 14 is a ray diagram useful in understanding operations in connection with the camera arrangements described in connection with FIGS. 9 and 11 through 13.

As noted above, the camera arrangements described above in connection with FIGS. 11 through 13 make use of generally cylindrical optical elements, with the interior surface of the optical element 111 being smooth. It will be appreciated that, if a cylindrical optical element is used, panoramic images subtending a predetermined vertical angle (where the optical axis of the camera in, for example, camera arrangement 110 is disposed vertically) can be recorded. A problem can arise, however, if the vertical angle becomes relatively large. This will be illustrated in connection with FIG. 14. With reference to FIG. 14, that FIG. depicts one sawtooth element S of an optical element, a viewing circle V and an optical center O. A ray A in the plane of the viewing circle would, if unrefracted by the sawtooth element S, be tangent to the viewing circle at point R; however, as noted above, the sawtooth element S is configured so that the ray A will be refracted onto ray a, so that it will pass through the optical center O. On the other hand, a ray B displaced by some height above the plane of the viewing circle V, which, if unrefracted by the sawtooth element S, would also be tangent to the viewing circle at point R, will not be refracted onto ray b and pass through the optical center O. Instead, the ray B will be refracted onto ray d, and pass through a point X some distance from the optical center O. The distance will depend on the angle of incidence of the ray B with respect to the exterior surface of the sawtooth element S and the index of refraction, both of which will essentially determine the angles with which the ray will be refracted on both the exterior and interior surfaces. In any case, the angle will be such that the ray will, instead of being refracted onto ray b, be refracted onto ray d.

Figure 15:
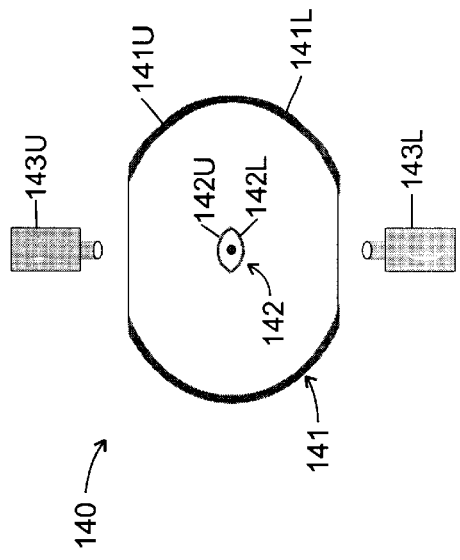
FIG. 15 schematically depicts an illustrative camera arrangement that can be used in the stereo panoramic camera arrangement depicted in FIG. 10, the camera arrangement including an optical element in the form of a spherical Fresnel-like lens arrangement.

To accommodate that, panoramic images subtending a larger vertical angle can be provided by providing an optical element in the form of, for example, a sphere instead of a cylinder. It will be appreciated that, with such an optical element, rays incident thereon which would be tangent to the viewing circle will generally pass through the optical center. This will be described in connection with FIG. 15. With reference to FIG. 15, camera arrangement 140 includes a generally spherical optical element 141, an omnidirectional mirror 142 and two cameras 143U and 143L ("U" and "L" referring to "upper" and "lower"). The cameras 143U and 143L share a common optical axis. As with the cylindrical optical element used in the camera arrangements described in connection with FIGS. 11 through 13, the exterior surface of the optical element 141 is provided with sawtooth elements similar to those described above in connection with FIGS. 12A through 12D, whose lengths are parallel to the optical axes of the cameras 143U and 143L. The omnidirectional mirror 142 includes upper and lower mirror elements 142U and 142L. The upper mirror element 142L is configured to reflect rays that are directed thereto by the upper hemisphere of the optical element 141 toward the upper camera 143U, and the lower mirror element 142L is configured to reflect rays that are directed thereto by the lower hemisphere toward the lower camera 143L. The spherical shape of the optical element 141 and contours of the upper and lower mirror elements 142U and 142R are selected so as to provide rays from a relatively wide vertical angle to the respective upper and lower cameras 143L and 143R. It will be appreciated that the images recorded by the respective upper and lower cameras 143U and 143L will be of the upper and lower portions of the scene (not shown) surrounding the camera arrangement 140, and the images can be mosaiced together to provide a stereo panoramic image that subtends a relatively large angle upwardly and downwardly.

As noted above, the exterior surface of optical element 141 is provided with sawtooth elements that are similar to those described above in connection with FIGS. 12A through 12D. It will be appreciated that the widths of the sawtooth elements will be widest at the optical element's equator, that is, the location of the optical element 141 that intersects a plane perpendicular to the cameras' optical axes at the omnidirectional mirror 142, and will taper upwardly and downwardly therefrom. It will be appreciated that the sawtooth elements used in the optical element 141 may comprise any of the elements described above in connection with FIGS. 12A through 12D. It will be appreciated, however, that, if the sawtooth pattern conforms to that described above in connection with FIG. 12A, for example, the upper camera 143U will record a left panoramic image and the lower camera 143L will record a right panoramic image. Similarly, if the sawtooth pattern conforms to that described above in connection with FIG. 12B, the upper camera 143U will record a right panoramic image and the lower camera 143L will record a left panoramic image. On the other hand, if the if the sawtooth pattern conforms to that described above in connection with FIGS. 12C and 12D, and if each of the upper camera 143U and lower camera 143L corresponds to the combination of cameras 134L and 134R and beam splitter 133, the cameras will record both the left and right panoramic images of a stereo panoramic image pair.

The invention provides a number of advantages. In particular, the invention provides various camera arrangements including mirrors and lenses configured to provide images that may be used in connection with generating panoramic images that, in turn, may form left or right images of a stereo panoramic image pair.

It will be appreciated that numerous modifications may be made to the camera arrangements as described above. For example, the cameras used in the camera arrangements may be still cameras or movie cameras. In addition, the cameras may use film, electronic recording, or other recording methodologies to record respective images.

In addition, it will be appreciated that, in the stereo panoramic camera arrangement, the same type of camera arrangement may be used as the left and right camera arrangement, or different types of camera arrangements may be used. For example, one of the left or right camera arrangement used in the stereo panoramic camera arrangement may comprise one of the camera arrangement 80 (FIG. 8) or 90 (FIG. 9), and the other of the left or right camera arrangement may comprise the other of the camera arrangement 80 or 90. Similarly, one of the left or right camera arrangement used in the stereo panoramic camera arrangement may comprise one of the camera arrangement 10 (FIG. 2) or 60 (FIG. 6B), and the other of the left or right camera arrangement may comprise the other of the camera arrangement 10 or 60. In addition, one of the left or right camera arrangement used in the stereo panoramic camera arrangement may be one that makes use of one or more mirrors and the other may be one that makes use of one or more lenses.

Furthermore, and, with reference to the camera arrangements described above in connection with FIGS. 11 through 13, it will be appreciated that the sawtooth elements may be relatively narrow, or they may be relatively wide. In addition, although, in the portions 120C and 120D that are described in connection with FIGS. 12C and 12D, the left and right sawtooth elements 123L and 123R are depicted as alternating in the interlaced pattern, an optical element may comprise a series of a predetermined number of left sawtooth elements 123L and a series of a predetermined number of right sawtooth elements 123R. It will be appreciated that, depending on the width of the sawtooth elements 123L and 123R, and further depending on the number of left and right sawtooth elements in each series, there may be black vertical stripes in the respective left and right panoramic image, which represent regions that are shaded by the sawtooth elements of the other type. That is, for example, black vertical stripes in a left panoramic image would represent regions that are shaded by sawtooth elements 123R, and black vertical strips in a right panoramic image would represent regions that are shaded by sawtooth elements 123L. To accommodate this and eliminate black vertical stripes, the respective optical element can be rotated around the camera's optical axis, preferably at a rate that relates to the integration time of the camera's image capture element, that is, charge-coupled device (CCD), CMOS, film, and so forth.

In addition, although, for the optical elements that are generally Fresnel or Fresnel-like lenses, although the sawtooth surface has been described as being on the exterior of the optical element, with a smooth surface being on the interior, it will be appreciated that the sawtooth surface may instead be on the interior and a smooth surface being on the exterior. In addition, the tagging elements may be on the sawtooth surface instead of the smooth surface.

In addition, although, for optical elements in the form of lenses, the optical elements have been described generally having the cylindrical or spherical form, it will be appreciated that the optical elements may have other forms, and may taper, flare or any combination thereof from respective "equators" toward respective upper and lower ends.

In addition, although in connection with FIGS. 14 and 15, the use of a generally spherical optical element has been described in connection with the matter described in FIG. 14, it will be appreciated that other arrangements may be used instead. For example, a Fresnel or Fresnel-like sawtooth arrangement, with the sawtooth elements running orthogonal to the elements described in connection with FIGS. 9 and 11 through 12D, may be provided, to refract the desired rays through the optical center. Other arrangements may be apparent to those skilled in the art.

In addition, although, in connection with FIG. 13, the stereo panoramic camera arrangement has been described as making use of a polarizing cube beam splitter, it will be appreciated that a conventional beam splitter can be used instead, with polarizers being placed between the conventional beam splitter and the respective cameras to provide rays only of the appropriate polarization to the respective cameras.

In addition, although the stereo panoramic camera arrangements described in connection with FIGS. 7 and 10 have been described as making use of a beam splitter and mirror in the shape of a frustum of a cone (in the case of FIG. 7) or a parabola (in the case of FIG. 10), it will be appreciated that the beam splitter and mirror may take on any form that will facilitate splitting of rays from an external scene (in the case of the beam splitter) and providing the split rays to respective camera arrangements for recording respective left and right panoramic images of a stereo panoramic image pair.

In addition, it will be appreciated that the cameras may be of any form, including but not limited to still cameras, movie cameras, video cameras and the like, and may record the images on any recording medium. In addition, although the cameras have been described as generally being omnidirectional cameras, they may be conventional cameras and may make use of, for example, wide-angle lenses.

In addition, it will be appreciated that, instead of a Fresnel or Fresnel-like lens, an optical element may make use of diffractive or holographic elements. Furthermore, elements may be added that can correct for color aberrations, as is common in optical systems.

Furthermore, it will be appreciated that, although the camera arrangements have been described as including optical elements that are configured to record images of rays that are either lit reflected or refracted toward an optical center such that the rays would, if undeflected, be tangent a viewing circle, it will be appreciated that the optical elements may, instead be tangent to viewing devices of other shapes, including, but not limited to, polygons, curves of any contour and other elements other than a single point.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A camera arrangement comprising
   A. a camera configured to record an image defined by rays directed thereto; and
   B. an optical element configured to deflect rays from a scene to the camera for recording thereby, the optical element being further configured either to deflect rays such that, if the rays were undeflected, the rays would instead be tangent to a locus of positions of a viewing device, the locus having a predetermined shape or to deflect rays that are tangent to a locus of positions of a viewing device, the locus having a predetermined shape, to the camera for recording thereby.

2. A camera arrangement as defined by claim 1 in which the locus is in the shape of a curve.

3. A camera arrangement as defined in claim 2 in which the curve is a closed continuous curve.

4. A camera arrangement as defined in claim 3 in which the continuous curve is a circle.

5. A camera arrangement as defined in claim 1 in which the viewing device is in the shape of a polygon.

6. A camera arrangement as defined in claim 1 in which the optical element is in the form of a curved mirror.

7. A camera arrangement as defined in claim 1 in which the optical element is in the form of a lens.

8. A camera arrangement according to claim 1 wherein the optical element deflects rays from the scene that are incident from a range of directions to the camera to provide a panoramic image thereon.

9. A camera arrangement according to claim 3 wherein the rays are or would be tangent to the curve in a direction corresponding to a series of left viewing positions of a set of stereographic viewing positions.

10. A camera arrangement according to claim 3 wherein the rays are or would be tangent to the curve in a direction corresponding to a series of right viewing positions of a set of stereographic viewing positions.

11. A camera arrangement according to claim 1 wherein the optical element is configured to deflect rays such that, if the rays were undeflected, the rays would instead be tangent to a locus of positions of predetermined shape.

12. A camera arrangement according to claim 1 wherein the optical element is configured to deflect rays that are tangent to a locus of positions of predetermined shape to the camera for recording thereby.

13. A sterographic camera arrangement comprising at least one camera arrangement according to claim 1 configured to record rays that are or would be tangent to the curve in a direction corresponding to a series of right viewing positions of a set of stereographic viewing positions and to record rays that are or would be tangent to the curve in a direction corresponding to a series of left viewing positions of a set of sterographic viewing positions to form a pair of sterographic images.

14. A sterographic camera arrangement according to claim 13 wherein the optical element deflects rays from the scene that are incident from a range of directions to the at least one camera to provide a pair of sterographic panoramic image thereon.

15. A sterographic camera according to claim 13 wherein the at least one camera arrangement comprises a pair of camera arrangements which respectively record right and left sterographic images.

16. A sterograpic camera arrangement according to claim 15 wherein the optical elements deflects rays from the scene that are incident from a range of directions to the at least one camera to provide a pair of sterographic panoramic image thereon.

* * * * *